(12) United States Patent
Weihs et al.

(10) Patent No.: US 12,391,839 B2
(45) Date of Patent: Aug. 19, 2025

(54) COATING FORMULATION FOR A DIGITAL PRINT MEDIUM

(71) Applicant: OMYA INTERNATIONAL AG, Oftringen (CH)

(72) Inventors: Jan Philipp Weihs, Dudingen (CH); Georg Häusler, Alberswil (CH)

(73) Assignee: OMYA INTERNATIONAL AG, Oftringen (CH)

( * ) Notice: Subject to any disclaimer, the term of this patent is extended or adjusted under 35 U.S.C. 154(b) by 650 days.

(21) Appl. No.: 17/310,056

(22) PCT Filed: Jan. 24, 2020

(86) PCT No.: PCT/EP2020/051744
§ 371 (c)(1),
(2) Date: Jul. 14, 2021

(87) PCT Pub. No.: WO2020/152328
PCT Pub. Date: Jul. 30, 2020

(65) Prior Publication Data
US 2022/0049117 A1  Feb. 17, 2022

(30) Foreign Application Priority Data
Jan. 25, 2019 (EP) .................................. 19153693

(51) Int. Cl.
*C09D 11/38* (2014.01)
*B41M 5/00* (2006.01)
(Continued)

(52) U.S. Cl.
CPC ......... *C09D 11/322* (2013.01); *B41M 5/0023* (2013.01); *C09D 11/033* (2013.01);
(Continued)

(58) Field of Classification Search
CPC ............... C09D 11/322; C09D 11/033; C09D 11/037; C09D 11/106; C09D 11/38; B41M 5/0023; B41M 5/52; B41M 5/5218
(Continued)

(56) References Cited

U.S. PATENT DOCUMENTS 5,405,678 A     4/1995  Bilodeau
2005/0260428 A1*  11/2005  Song ..................... B41M 5/52
                                                428/323
(Continued)

FOREIGN PATENT DOCUMENTS

EP      2465903 A1    6/2012
WO  02/085638 A1   10/2002
(Continued)

OTHER PUBLICATIONS

International Search Report from PCT/EP2020/051744, mailed Mar. 29, 2020, 3 pages.
(Continued)

*Primary Examiner* — Ruiyun Zhang
(74) *Attorney, Agent, or Firm* — ALGM LLP; Harry J. Guttman

(57) ABSTRACT

The present invention relates to a cationic coating formulation, which contains beside water a specific anionic ultrafine ground calcium carbonate, a non-ionic polyvinyl alcohol, a water-soluble salt of a divalent metal ion, a dispersing agent and a cationic polymer. Said coating formulation according to the present invention can be used for manufacturing a digital print medium, preferably an inkjet print medium.

24 Claims, 1 Drawing Sheet

(51) Int. Cl.
  *C09D 11/033*  (2014.01)
  *C09D 11/037*  (2014.01)
  *C09D 11/106*  (2014.01)
  *C09D 11/322*  (2014.01)
  *B41M 5/52*  (2006.01)

(52) U.S. Cl.
  CPC .......... *C09D 11/037* (2013.01); *C09D 11/106* (2013.01); *C09D 11/38* (2013.01); *B41M 5/52* (2013.01); *B41M 5/5218* (2013.01)

(58) Field of Classification Search
  USPC .......................................................... 524/425
  See application file for complete search history.

(56) References Cited

U.S. PATENT DOCUMENTS

| | | | |
|---|---|---|---|
| 2008/0204538 A1 | 8/2008 | Kovacs et al. | |
| 2015/0030869 A1* | 1/2015 | Preston | C08L 21/02 |
| | | | 524/425 |
| 2015/0210103 A1* | 7/2015 | Weihs | C04B 38/0051 |
| | | | 427/209 |

FOREIGN PATENT DOCUMENTS

| | | | | |
|---|---|---|---|---|
| WO | 2013/121213 A1 | 8/2013 | | |
| WO | 2014/044778 A1 | 3/2014 | | |
| WO | WO-2019226582 A1 * | 11/2019 | .............. | C09D 7/61 |

OTHER PUBLICATIONS

Written Opinion from PCT/EP2020/051744, mailed Mar. 29, 2020, 5 pages.
Gane et al. (1996) "Void Space Structure of Compressible Polymer Spheres and Consolidated Calcium Carbonate Paper-Coating Formulations" Ind. Eng. Chem. Res., vol. 35, pp. 1753-1764.
Ridgway et al. (2003) "A new method for measuring the liquid permeability of coated and uncoated papers and boards" Nordic Pulp and Paper Research Journal, vol. 18, No. 4, pp. 377-381.
Ridgway et al. (2004) "Modified calcium carbonate coatings with rapid absorption and extensive liquid uptake capacity" Colloids and Surfaces A: Physicochem. Eng. Aspects, vol. 236, pp. 91-102.
Schoelkopf et al. (2000) "Measurement and Network Modeling of Liquid Permeation into Compacted Mineral Blocks" Journal of Colloid and Interface Science, vol. 227, pp. 119-131.

* cited by examiner

COATING FORMULATION FOR A DIGITAL PRINT MEDIUM

CROSS-REFERENCE TO RELATED APPLICATIONS

This application is a National Stage Entry of International Application No. PCT/EP2020/051744 filed Jan. 24, 2020, entitled "COATING FORMULATION FOR A DIGITAL PRINT MEDIUM", and which claims priority to EP application Ser. No. 19153693.7 filed Jan. 25, 2019, entitled "COATING FORMULATION FOR DIGITAL PRINTING MEDIA."

The present invention relates to a cationic coating formulation, a process for its preparation, and its use, specifically its use for the manufacturing of a digital printing medium.

Digital printing, and especially inkjet printing, has become increasingly important in industrial printing processes in recent years, since it offers various advantages over traditional printing technology based on offset or flexographic printing. For example, digital printing is not based on "analogue" media such as printing plates or cylinders, and consequently does not need a time-consuming preparation of such media and also does not require the service work connected therewith, e.g. press make-ready, plate mounting, registration adjustment etc. Thereby, digital printing processes often offer more cost-effective short-runs, a shorter time to market and a higher flexibility with regard to printing images. Furthermore, digital printing processes provide the possibility to manufacturers to customize or personalize printing images, which often adds value to products such as articles of commerce.

Suitable print media for digital printing typically comprises a toner- or ink-receptive coating layer made by treating a base substrate with a coating formulation. Such toner- or ink-receptive coating layers need to fulfil several requirements to ensure a high image quality of the print. For example, in inkjet printing a high affinity between the deposited ink and the print medium is of high relevance. In particular, rapid absorption of water- or solvent-based ink droplets and fast drying times are necessary to avoid smearing of the ink in downstream processes and/or a mottled appearance of the printed image. It is also desirable that the ink pigments and/or dyes are immobilized at the surface of the print medium to minimize a bleeding into the substrate, which may reduce the optical print density of the colours. Furthermore, the brightness of the print medium has an influence on the image quality of the print. A high brightness usually leads to a high contrast between the medium and the ink dots thereby improving the colour intensity and the colour gamut of the print.

Coating formulations for flexographic printing or formation of toner- or ink-receptive coating layers are known in the prior art. Exemplarily, reference is made to U.S. Pat. No. 5,405,678 which refers to an ink jet paper comprising a substrate coated with a composition comprising a latex film which has not been fully coalesced. The coating on the ink jet recording sheet is obtained by coating a composition comprised of a hydrophobic polymer latex onto the sheet, and the drying at a temperature below the film forming temperature of the polymer latex. WO 2014/044778 A1 relates to a print medium and a method of producing such a print medium. In particular, the application is directed to a print medium comprising a substrate having a first and a reverse side, and at least one coating layer on one of the substrate sides. Furthermore, US 2008/0204538 A1 refers to methods and devices for forming, such as printing, high quality, high throughput, ultraviolet curable gel ink images on corrugated substrates for packaging applications. WO 02/085638 A1 discloses a primed substrate comprising radiation cured ink jetted images and methods of ink jet printing radiation curable inks that employ applying a primer. The image articles are durable for outdoor usage. Furthermore, WO 2013/121213 A1 relates to pigment compositions and aqueous coating compositions comprising said pigment compositions which are suitable for coating paper products, particularly inkjet paper products.

However, very often specific additional measures have to be taken in order to achieve the desired printing results. For example, manufacturers have to apply a primer as a top coat onto the coating of the print medium to achieve a high affinity between the deposited ink and the ink-receptive coating and to improve the fixation of the ink pigments and/or dyes on the surface of the medium. The application of the primer is generally performed via an additional process step in-line in the printing process or via a finishing step in the preparation of the coated print medium. This is associated with extra costs for additional process steps, chemicals or substrate preparation, and consequently reduces the margins for the digitally printed products.

Moreover, manufacturers of high quality inkjet prints usually have to use digital print media with a bright base substrate to make sure that the base substrate does not decrease the brightness of the ink-receptive coating of the substrate surface. A decreased brightness of the ink-receptive coating can lead to a loss of contrast between the print image and the print medium, and, therefore, to a poorer print quality. In some cases, this can limit the choice of the digital print medium. For example, inkjet printing on a (coated) brownish kraft paper of a containerboard often leads to printing images which are not acceptable for a commercial use in consumer products. Therefore, the inkjet printing of such print medium is often limited to certain monochromic applications, e.g. case coding on shipping boxes, unless a bleached, more expensive kraft paper as base substrate is used for the manufacturing of the containerboard.

Therefore, there is a continuous need in the art for coating formulations for digital print media, and especially for inkjet print media, which improve the image quality of digital prints. In particular, there is a need for a coating formulation with an improved ink absorption and an improved pigment and/or dye fixation at the surface of the print medium. Furthermore, a coating formulation would be desirable which does not require the separate application of a primer prior and/or after its application.

There is also a need in the art for a coating formulation providing a satisfying surface brightness and coverage for a digital print medium even when applied to a base substrate of significantly lower brightness such as brownish recycled paper or paperboard.

Accordingly, an objective of the present invention may be seen in the provision of a coating formulation for a digital print medium, especially an inkjet print medium, which leads to an improved image quality in digital printing, a coating formulation for an inkjet print medium which forms an ink-receiving coating with an improved ink absorption and an improved pigment and/or dye fixation at the surface of the print medium, and/or a coating formulation for a digital print medium which requires no or less separate process steps prior and/or after its application. Yet another objective of the present application is the provision of a coating formulation which significantly improves the surface brightness and colour gamut of a digital print medium.

One or more of the foregoing objectives is/are solved by the present invention. According to a first aspect the present invention relates to a cationic coating formulation as defined in independent claim 1.

Advantageous embodiments of the inventive cationic coating formulation are defined in the corresponding subclaims. When in the following reference is made to embodiments of the present invention, it is to be understood that these embodiments refer to the inventive cationic coating formulation, the process for its preparation and the inventive use and that these embodiments are also disclosed in combination.

According to one aspect of the present invention a cationic coating formulation is provided. The cationic coating formulation consists of: water, at least one anionic ultrafine ground calcium carbonate, at least one non-ionic polyvinyl alcohol, at least one water-soluble salt of a divalent metal ion, at least one dispersing agent, and at least one cationic polymer, wherein the at least one anionic ultrafine ground calcium carbonate, when in the form of a compacted bed, has a monomodal pore size distribution, a volume defined pore size polydispersity expressed as full width at half maximum (FWHM) from 40 to 80 nm, and a volume defined median pore diameter from 30 to 80 nm, and wherein the cationic coating formulation has a solid content in the range from 10 to 80 wt.-%, based on the total weight of the cationic coating formulation.

According to one embodiment of the present invention, the cationic coating formulation of the present invention consists of the following components: 30-60 wt.-% of water, 30-60 wt.-% of the at least one anionic ultrafine ground calcium carbonate, 0.1-3.0 wt.-% of the at least one non-ionic polyvinyl alcohol, 0.1-4.0 wt.-% of the at least one dispersing agent, 0.1-4.0 wt.-% of the at least one water-soluble salt of a divalent metal ion, 0.1-5.0 wt.-% of the at least one cationic polymer, based on the total weight of the cationic coating formulation, and wherein the total sum of the components in the cationic coating formulation is 100 wt.-%.

According to another inventive embodiment of the cationic coating formulation, the at least one water-soluble salt of a divalent metal ion is selected from the group consisting of $CaCl_2$, $CaBr_2$, $CaI_2$, $Ca(NO_3)_2$, $MgCl_2$, $MgBr_2$, $MgI_2$, and $Mg(NO_3)_2$, preferably $CaCl_2$.

According to another inventive embodiment of the cationic coating formulation, the at least one dispersing agent is selected from the group consisting of polyacrylate-based dispersing agents, polyphosphate-based dispersing agents, carboxymethyl cellulose or a salt thereof, or mixtures thereof.

According to another inventive embodiment of the cationic coating formulation, the at least one cationic polymer is polydiallyldimethylammonium chloride (PolyDadmac) or a polyethyleneimine.

According to another inventive embodiment of the cationic coating formulation, the at least one anionic ultrafine ground calcium carbonate is in the form of an aqueous suspension having a solid content in the range from 10 to 99.9 wt.-%, preferably from 30 to 80 wt.-%, and more preferably from 50 to 70 wt.-%, based on the total weight of the aqueous suspension.

According to another inventive embodiment of the cationic coating formulation, the cationic coating formulation has a solid content in the range from 20 to 70 wt.-%, preferably from 30 to 60 wt.-%, based on the total weight of the cationic coating formulation.

According to yet another inventive embodiment, the cationic coating formulation consists of the following components: 40-60 wt.-% of water, 30-56 wt.-% of the at least one anionic ultrafine ground calcium carbonate, 0.5-2.0 wt.-% of the at least one non-ionic polyvinyl alcohol, 0.3-1.0 wt.-% of the at least one dispersing agent, 0.1-1.5 wt.-% of the at least one water-soluble salt of a divalent metal ion, 0.1-2.5 wt.-% of the at least one cationic polymer, based on the total weight of the cationic coating formulation, wherein the total sum of the components in the cationic coating formulation is 100 wt.-%, wherein the at least one dispersing agent is a polyacrylate-based dispersing agent, wherein the at least one water-soluble salt of a divalent metal ion is $CaCl_2$, and wherein the at least one cationic polymer is polydiallyldimethylammonium chloride (PolyDadmac).

According to another aspect of the present invention, a process for the preparation of a cationic coating formulation as described herein is provided. The process comprises the steps of:

a) providing water,
b) providing at least one anionic ultrafine ground calcium carbonate,
c) providing at least one non-ionic polyvinyl alcohol,
d) providing at least one water-soluble salt of a divalent metal ion,
e) providing at least one dispersing agent,
f) providing at least one cationic polymer, and
g) combining the components of steps a) to f) to form a cationic coating formulation.

According to another aspect of the present invention, the use of a cationic coating formulation as described herein for manufacturing a digital print medium, preferably an inkjet print medium, is provided.

According to one embodiment of the present invention, the digital print medium is, an optionally pretreated and/or calendered, paper, paperboard, containerboard, textile, metal, concrete, wood or wood-based board, or a polymer, and preferably paper, paperboard or containerboard.

According to one embodiment of the present invention, the digital print medium is a pre-coated digital print medium.

According to another embodiment of the present invention, the digital print medium contains recycled material, and preferably recycled paper or paperboard.

According to another embodiment of the present invention, the recycled material is present in the digital print medium in an amount of 50 to 99.5 wt.-%, preferably 70 to 98 wt.-%, based on the total weight of the digital print medium.

According to yet another embodiment of the present invention, the use of the cationic coating formulation increases the brightness of the digital print medium by 10%, preferably 30%, more preferably 50%, as measured according to ISO R457 (Tappi452) and DIN 6167.

According to yet another embodiment of the present invention, no primer is added to the digital print medium prior and/or after the application of the cationic coating formulation onto the digital print medium.

It should be understood that for the purposes of the present invention, the following terms have the following meanings:

A "cationic" coating formulation in the meaning of the present invention refers to a formulation with a positive charge. The charge can be measured by polyelectrolyte titration (PET) as indicated in the experimental section. It is understood by the person skilled in the art, that a positive charge of the formulation can be achieved without undue burden by adjusting the ratio of the at least one cationic polymer and the at least one anionic ultrafine ground calcium carbonate.

An "anionic" ultrafine ground calcium carbonate in the meaning of the present invention refers to an aqueous suspension comprising the dispersed ultrafine ground calcium carbonate, which has a negative charge. The charge can be measured by polyelectrolyte titration as indicated in the experimental section.

The term "ultrafine" ground calcium carbonate in the meaning of the present invention refers to a ground calcium carbonate with a particle size $d_{50}$ of ≤300 nm.

Throughout the present document, the "particle size" of a pigment particle is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all particle grains are bigger or smaller than this particle size. For the purpose of the present invention the particle size is specified as weight median particle size $d_{50}$ unless indicated otherwise. For determining the weight median particle size $d_{50}$ value a Sedigraph 5120 device from the company Micromeritics, USA, can be used.

"Ground calcium carbonate" (GCC) in the meaning of the present invention is a calcium carbonate obtained from natural sources, such as limestone, marble, calcite, chalk or dolomite, and processed through a wet and/or dry treatment such as grinding, screening and/or fractionation, for example by a cyclone or classifier.

A "non-ionic polyvinyl alcohol" in the meaning of the present invention is a homopolymer of a fully or partially hydrolysed polyvinyl alcohol or a copolymer, based on a fully or partially hydrolysed polyvinyl alcohol, which does not contain charged functional groups, e.g. carboxyl groups, sulfonic acid groups, ammonium groups etc.

For the purpose of the present application, "water-soluble" materials are defined as materials which, when mixed with deionised water and filtered on a filter having a 0.2 µm pore size at 20° C. to recover the liquid filtrate, provide greater than 0.1 g of recovered solid material following evaporation at 95 to 100° C. of 100 g of said liquid filtrate. "Water-insoluble" materials are defined as materials leading to the recovery of less than or equal to 0.1 g of recovered solid material following evaporation at 95 to 100° C. of 100 g of said liquid filtrate.

A "divalent metal ion" in the meaning of the present invention refers to a main group metal or transition metal with an oxidation state of "2+". Non-limiting examples of such divalent metal ions are $Mg^{2+}$, $Ca^{2+}$, $Fe^{2+}$, $Ni^{2+}$, $Cu^{2+}$ or $Zn^{2+}$.

A "cationic polymer" in the meaning of the present invention is a polymer which has a cationic charge, i.e. which contains positively charged functional groups in the molecule and does not contain a negatively charged functional group in the same molecule. Positively charged functional groups are, for example, groups containing quaternary nitrogen atoms.

A "compacted bed" in the meaning of the present invention is a tablet formulation of a pigment being formed in a wet tablet press apparatus. For example, a compacted bed may be formed by applying a constant pressure (usually 15 bar) to a pigment suspension or slurry for several hours such that water is released by filtration through a fine 0.025 µm filter membrane resulting in a compacted bed or tablet of the pigment with a diameter of about 4 cm and a thickness of 1 to 1.5 cm. Such an apparatus is, for example, shown schematically in Ridgway et al. "Modified calcium carbonate coatings with rapid absorption and extensive liquid uptake capacity" (Colloids and Surfaces A: Physiochem. and Eng. Asp. 2004, 236(1-3), 91-102).

In the context of the present invention, the term "pore" is to be understood as describing the space that is found between the pigment particles, i.e. that is formed by the pigment particles and that allows the passage or absorption of fluids. The size of the pores can be defined by their "volume defined median pore diameter" as described below.

The term "monomodal pore size distribution" as used herein refers to a collection of pores which have a single clearly discernable maximum on a pore size distribution curve (intensity on the ordinate or y-axis, and logarithmically arrayed pore size on the abscissa or x-axis).

The term "volume defined pore size polydispersity" is to be understood as a characteristic describing the breadth of distribution of pore size diameters to be found between the pigment particles. For the purpose of the present invention the volume defined pore size polydispersity is expressed as full width at half maximum of the single pore size distribution peak. A "full width at half maximum (FWHM)" is an expression of the extent of a function, given by the difference between the two extreme values of the independent variable at which the dependent variable is equal to half of its maximum value. The technical term full width at half maximum, or FWHM, is used to approximate the diameter distribution of the majority of the pores, i.e. the polydispersity of the pore sizes.

In the present context the term "volume defined median pore diameter" will refer to the pore size, below which 50% of the total specific pore volume is intruded into finer than the Young-Laplace equation defined equivalent capillary diameter, where the Young-Laplace equation is applied to the mercury intrusion curve obtained, e.g. by the mercury porosimetry experiment described above. A definition of the term "volume defined median pore diameter" can be found in Ridgway et al. "Modified calcium carbonate coatings with rapid absorption and extensive liquid uptake capacity" (Colloids and Surfaces A: Physiochem. and Eng. Asp. 2004, 236(1-3), 91-102).

A "primer" in the meaning of the present invention refers to a compound, especially a polymer composition which is applied prior or after the application of an ink-receptive layer on a print medium to improve the absorption of an ink and to improve the immobilization of pigments and/or dyes contained at the surface of the ink receptive layer. Such polymer compositions can include polymers such as polyacrylic acids, polyacrylates, and especially sodium polyacrylates, polyacrylic amides, polyvinylpyrrolidones, acrylic nitriles, gelatin, cellulose, amylopectin, copolymers thereof, or mixtures thereof.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

In the following, it is referred to further details of the present invention:

Cationic Coating Formulation

The present invention refers in one aspect to a cationic coating formulation consisting of:
water,
at least one anionic ultrafine ground calcium carbonate,
at least one non-ionic polyvinyl alcohol,
at least one water-soluble salt of a divalent metal ion,
at least one dispersing agent, and at least one cationic polymer,
wherein the at least one anionic ultrafine ground calcium carbonate, when in the form of a compacted bed, has a monomodal pore size distribution,
a volume defined pore size polydispersity expressed as full width at half maximum (FWHM) from 40 to 80 nm, and
a volume defined median pore diameter from 30 to 80 nm, and
wherein the cationic coating formulation has a solid content in the range from 10 to 80 wt.-%, based on the total weight of the cationic coating formulation.

The inventors surprisingly found out that the coating formulation as described above improves the printability of a digital print medium, and especially the printability of an inkjet print medium. More precisely, a digital print medium coated with the inventive coating formulation shows a decreased bleeding tendency and an increased speed of ink absorption in digital printing applications. The sheet and print gloss of the substrate can also be improved. By applying the inventive formulation onto the surface of a digital print medium, the use of a primer prior or after the application of the formulation becomes unnecessary. Furthermore, the inventors found that the coating formulation significantly improves the brightness of a print medium. By applying the inventive formulation on a print medium, even a print medium with comparably low brightness such as brown recycled paper or paperboard, the medium shows a comparably high brightness and, therefore, results in a good print image with excellent image contrast.

Without wishing to be bound to any theory, it is assumed that it is the specific combination of cationic polymer, anionic ultrafine ground calcium carbonate and a metal salt of a divalent metal ion in the presence of a dispersing agent and the a non-ionic polyvinyl alcohol that allows to provide a coating layer benefiting from the advantageous properties of the anionic ultrafine ground calcium carbonate and a charge interaction of the cationic components with the (often anionic) ink components. More specifically, it is speculated that the specific selection of such charged compounds leads to a) an improved ink absorbability due to an uniform pore size of the calcium carbonate expressed by the above-defined volume defined pore size polydispersity range, b) a high light scattering and a high smoothness of the surface, and thus an improved brightness and an improved sheet and/or print gloss, caused by the ultrafine particle size of the calcium carbonate, and c) an improved optical print density due to the immobilization of the ink components by the overall positively charged nature of the coating layer.

The cationic coating formulation of the present invention must contain water. The inventive formulation is not limited to a specific type of water. The formulation may contain tap water, distilled water, deionized water, or mixtures thereof.

According to one embodiment, the cationic coating formulation contains water in an amount of 30 to 60 wt.-%, preferably 40 to 60 wt.-% of water, based on the total weight of the cationic coating formulation.

The cationic coating formulation of the present invention must contain at least one anionic ultrafine ground calcium carbonate, wherein the at least one anionic ultrafine ground calcium carbonate, when in the form of a compacted bed, has a monomodal pore size distribution, a volume defined pore size polydispersity expressed as full width at half maximum (FWHM) from 40 to 80 nm, and a volume defined median pore diameter from 30 to 80 nm.

According to one embodiment of the present invention, the at least one anionic ultrafine ground calcium carbonate, when in form of a compacted bed, has a volume defined pore size polydispersity expressed as full width at half maximum (FWHM) from 40 to 70 nm, preferably from 40 to 60 nm, and most preferably from 40 to 50 nm.

According to one embodiment, the at least one anionic ultrafine ground calcium carbonate, when in form of a compacted bed, has a volume defined median pore diameter from 40 to 70 nm, and preferably from 50 to 70 nm.

According to another embodiment of the present invention, the at least one anionic ultrafine ground calcium carbonate, when in form of a compacted bed, has an intruded total specific void volume from 0.20 to 0.50 $cm^3/g$, preferably from 0.25 to 0.45 $cm^3/g$, and most preferably from 0.28 to 0.40 $cm^3/g$. In the context of the present invention, the term "intruded total specific void volume" is to be understood as describing the measured pore volume (that is found between the pigment particles) per unit mass of sample containing the pigment particles. The intruded total specific void volume can be measured by mercury porosimetry using a Micrometrics Autopore IV mercury porosimeter.

According to another embodiment, the at least one anionic ground calcium carbonate has a specific surface area (BET) from 15 to 40 $m^2/g$, preferably from 20 to 30 $m^2/g$.

The at least one anionic ground calcium carbonate of the present invention must be of ultrafine size, i.e. having a particle size $d_{50}$ of ≤300 nm, as defined above. According to one embodiment of the present invention, the at least one anionic ultrafine ground calcium carbonate has a particle size $d_{50}$ in the range of from 40 to 300 nm, preferably from 70 to 280 nm, and most preferably from 100 to 260 nm.

According to one embodiment, the at least one anionic ultrafine ground calcium carbonate is present in the inventive formulation in an amount from 30 to 60 wt.-%, and preferably in an amount from 30 to 56 wt.-%, based on the total weight of the cationic coating formulation.

The at least one anionic ultrafine ground calcium carbonate may be in the form of an aqueous suspension. According to one embodiment of the present invention, the at least one anionic ultrafine ground calcium carbonate is in form of an aqueous suspension having a solid content in the range from 10 wt.-% to 99.9 wt.-%, preferably from 30 wt.-% to 80 wt.-%, and more preferably from 50 wt.-% to 70 wt.-%, based on the total weight of the aqueous suspension.

The expression "at least one" anionic ultrafine ground calcium carbonate means that one or more kinds of an anionic ultrafine ground calcium carbonate may be present in the inventive cationic formulation. Accordingly, it is appreciated that the at least one anionic ultrafine ground calcium carbonate may be a mixture of two or more kinds of an anionic ultrafine ground calcium carbonate. According to a preferred embodiment of the present invention, one kind of an anionic ultrafine ground calcium carbonate is present in the cationic coating formulation.

Moreover, the cationic coating formulation of the present invention must contain at least one non-ionic polyvinyl alcohol. A suitable non-ionic polyvinyl alcohol is, for example, a fully hydrolysed polyvinyl alcohol, i.e. a polyvinyl alcohol containing an amount of less than 3.0% of polyvinyl acetate, and having a molecular weight in the range from 25 000 to 50 000 g/mol, and preferably 30 000 to 40 000 g/mol. However, the cationic coating formulation is not limited to such a non-ionic polyvinyl alcohol.

According to one embodiment, the at least one non-ionic polyvinyl alcohol is present in the cationic coating formulation in an amount from 0.1 to 3.0 wt.-%, and preferably in an amount from 0.5 to 2.0 wt.-%, based on the total weight of the cationic coating formulation.

The expression "at least one" non-ionic polyvinyl alcohol means that one or more kinds of a non-ionic polyvinyl alcohol may be present in the inventive cationic formulation. Accordingly, it is appreciated that the at least one non-ionic polyvinyl alcohol may be a mixture of two or more kinds of a non-ionic polyvinyl alcohol. According to a preferred embodiment of the present invention, one kind of a non-ionic polyvinyl alcohol is present in the cationic coating formulation.

Furthermore, the cationic coating formulation must contain at least one dispersing agent.

Conventional dispersing agents known to the skilled person can be used. According to one embodiment the at least one dispersing agent is selected from the group consisting of polyacrylate-based dispersing agents, phosphates, polyphosphate-based dispersing agents, carboxymethyl cellulose or a salt thereof, or mixtures thereof. A "polyacrylate-based" dispersing agent in the meaning of the present invention is a dispersing agent based on an at least partially neutralized homopolymer or copolymer of (meth)acrylic acid or an ester or amide thereof. A "polyphosphate-based" dispersing agent in the meaning of the present invention is a dispersing agent based on a condensation product of a salt of ortho-phosphoric acid.

Suitable phosphates as dispersing agents may be any salt of the ortho-phosphoric acid such as alkali salts of the ortho-phosphoric acid. A preferred phosphate dispersing agent is sodium phosphate.

According to a preferred embodiment, the at least one dispersing agent is a sodium or calcium polyacrylate, or a mixture of both, having a molecular weight $M_w$ of from 5 000 to 15 000 g/mol, preferably from 8 000 to 14 000 g/mol and most preferably of about 12 000 g/mol.

The polyacrylate-based dispersing agent may be a neutralized or a partially neutralized polyacrylate. According to a preferred embodiment, the at least one dispersing agent is a partially neutralized polyacrylate-based dispersing agent. According to a more preferred embodiment, the at least one dispersing agent is a partially neutralized sodium polyacrylate having a molecular weight $M_w$ of from 5 000 to 15 000 g/mol, preferably from 8 000 to 14 000 g/mol and most preferably of about 12 000 g/mol. The formation of a partially neutralized polyacrylate is well known to the skilled person and may, for example, be achieved by mixing a neutralized polyacrylate with phosphoric acid.

According to one embodiment, the at least one dispersing agent is present in the cationic coating formulation in an amount from 0.1 to 4.0 wt.-%, and preferably in an amount from 0.3 to 1.0 wt.-%, based on the total weight of the cationic coating formulation.

The at least one dispersing agent may be derived from the above-described aqueous suspension of the at least one anionic ultrafine ground calcium carbonate, where it can be present as an additive.

The expression "at least one" dispersing agent means that one or more kinds of a dispersing agent may be present in the inventive cationic formulation. Accordingly, it is appreciated that the at least dispersing agent may be a mixture of two or more kinds of a dispersing agent. According to a one embodiment of the present invention, one kind of a dispersing agent is present in the cationic coating formulation.

According to another embodiment, the at least one dispersing agent is a mixture of two kinds of dispersing agents present in the cationic coating formulation.

In case two kinds of dispersing agents are present in the cationic coating formulation, a mixture of a polyacrylate-based dispersing agent and a phosphate dispersing agent is preferred. Thus, in a preferred embodiment, the dispersing agent is a mixture of polyacrylate-based dispersing agent and a phosphate. In one embodiment, the dispersing agent is a mixture of sodium polyacrylate having a molecular weight $M_w$ of from 5 000 to 15 000 g/mol, preferably from 8 000 to 14 000 g/mol and most preferably of about 12 000 g/mol, and sodium phosphate.

The cationic coating formulation must further contain at least one water-soluble salt of a divalent metal ion.

As set out above, the inventors surprisingly found that a digital print medium coated with the inventive cationic coating formulation shows a faster ink absorption onto the surface of the coating layer, reduced mottle and/or an improved optical print density compared to a similar coating not containing the at least one water-soluble salt of a divalent metal ion. Thus, the water-soluble divalent metal salt or ion represents an essential component of the very specific inventive coating formulation.

According to one embodiment of the present invention, the at least one water-soluble salt of a divalent metal ion is selected from the group consisting of $CaCl_2$, $CaBr_2$, $CaI_2$, $Ca(NO_3)_2$, $MgCl_2$, $MgBr_2$, $MgI_2$, and $Mg(NO_3)_2$. According to a preferred embodiment, the at least one water-soluble salt of a divalent metal ion is $CaCl_2$.

According to one embodiment of the present invention, the at least one water-soluble salt of a divalent metal ion is present in the cationic coating formulation in an amount from 0.1 to 4.0 wt.-%, and preferably in an amount from 0.1 to 1.5 wt.-%, based on the total weight of the cationic coating formulation.

The expression "at least one" water-soluble salt of a divalent metal ion means that one or more kinds of a water-soluble salt of a divalent metal ion may be present in the inventive cationic formulation. Accordingly, it is appreciated that the at least water-soluble salt of a divalent metal ion may be a mixture of two or more kinds of a water-soluble salt of a divalent metal ion. According to a preferred embodiment of the present invention, one kind of a water-soluble salt of a divalent metal ion is present in the cationic coating formulation.

Moreover, the cationic coating formulation of the present invention must also contain at least one cationic polymer.

Suitable cationic polymers for the present invention are, for example, polyethyleneimine (PEI) or polydiallyldimethylammonium chloride (PolyDadmac). According to a preferred embodiment, the at least one cationic polymer is polydiallyldimethylammonium chloride (PolyDadmac) or a polyethyleneimine, and more preferably is polydiallyldimethylammonium chloride (PolyDadmac).

"Polyethyleneimines" in the meaning of the present invention are cationic polymers with a repeating unit —$(CH_2CH_2NH)_x$—, which is optionally further substituted at the nitrogen atom. Consequently, the polymer may be present in linear or branched form.

As set out above, it is understood by the person skilled in the art that a cationic coating formulation can be achieved without undue burden by adjusting the ratio of the at least one cationic polymer and the at least one anionic ultrafine ground calcium carbonate. Thus, it is also understood that the higher the cationic charge of the cationic polymer is, the less amount of the cationic polymer needs to be added to the coating formulation to render it cationic.

According to one embodiment of the present invention, the at least one cationic polymer is present in the cationic coating formulation in an amount from 0.1 to 5.0 wt.-%, and preferably in an amount from 0.1 to 2.5 wt.-%, based on the total weight of the cationic coating formulation.

The expression "at least one" cationic polymer means that one or more kinds of a cationic polymer may be present in the inventive cationic coating formulation. Accordingly, it is appreciated that the at least cationic polymer may be a mixture of two or more kinds of a cationic polymer. According to a preferred embodiment of the present invention, one kind of a cationic polymer is present in the cationic coating formulation.

The amounts of the above-described components of the cationic coating formulation of the present invention may vary with respect to each other.

A preferred embodiment of the cationic coating formulation of the present invention consists of the following components:
30-60 wt.-% of water,
30-60 wt.-% of the at least one anionic ultrafine ground calcium carbonate,
0.1-3.0 wt.-% of the at least one non-ionic polyvinyl alcohol,
0.1-4.0 wt.-% of the at least one dispersing agent,
0.1-4.0 wt.-% of the at least one water-soluble salt of a divalent metal ion,
0.1-5.0 wt.-% of the at least one cationic polymer,
based on the total weight of the cationic coating formulation, and wherein the total sum of the components in the cationic coating formulation is 100 wt.-%.

A more preferred embodiment of the cationic coating formulation of the present invention consists of the following components:
40-60 wt.-% of water,
30-56 wt.-% of the at least one anionic ultrafine ground calcium carbonate,
0.5-2.0 wt.-% of the at least one non-ionic polyvinyl alcohol,
0.3-1.0 wt.-% of the at least one dispersing agent,
0.1-1.5 wt.-% of the at least one water-soluble salt of a divalent metal ion,
0.1-2.5 wt.-% of the at least one cationic polymer,
based on the total amount of the cationic coating formulation, wherein the total sum of the components in the cationic coating formulation is 100 wt.-%,
wherein the at least one dispersing agent is a polyacrylate-based dispersing agent,
wherein the at least one water-soluble salt of a divalent metal ion is $CaCl_2$, and
wherein the at least one cationic polymer is polydiallyldimethylammonium chloride (PolyDadmac).

It is one prerequisite that the cationic coating formulation has as solid content in the range from 10 to 80 wt.-%, based on the total weight of the cationic coating formulation. According to one embodiment of the present invention, the cationic coating formulation has a solid content in the range from 20 to 70 wt.-%, and preferably from 30 to 60 wt.-%, based on the total weight of the cationic coating formulation.

In one embodiment, the cationic coating formulation has a pH of between 7 and 11, and preferably a pH from 8.5 to 10.

According to another embodiment, the cationic coating formulation has a Brookfield viscosity from 500 to 1200 mPa·s at 25° C., and preferably from 800 and 1200 mPa·s at 25° C. For the purpose of the present invention, the term "viscosity" or "Brookfield viscosity" refers to Brookfield viscosity. The Brookfield viscosity is for this purpose measured by a Brookfield (Typ RVT) viscometer at 25° C.±1° C. at 100 rpm using an appropriate spindle and is specified in mPa·s.

Preparation of the Cationic Coating Formulation

The present invention refers in another aspect to a process for the preparation of a cationic coating formulation as described above. The process comprises the steps of:
a) providing water,
b) providing at least one anionic ultrafine ground calcium carbonate,
c) providing at least one non-ionic polyvinyl alcohol,
d) providing at least one water-soluble salt of a divalent metal ion,
e) providing at least one dispersing agent,
f) providing at least one cationic polymer, and
g) combining the components of steps a) to f) to form a cationic coating formulation.

It is appreciated by the skilled person that each component of step b) to f) may be provided in dry form or in liquid form, e.g. in form of an aqueous suspension or aqueous solution. According to a preferred embodiment, the components of step b) to step f) are provided in liquid form.

Step g) of the inventive process refers to combining the components of steps a) to f) to form a cationic coating formulation.

The components of step a) to f) can be combined in any order. Thus, it is possible to first mix each component of step b) to f) with the water of step a) as mentioned above.

In some embodiments, water, the at least one anionic ultrafine ground calcium carbonate, and the at least one dispersing agent, are combined prior to admixing the at least one non-ionic polyvinyl alcohol, at least one water-soluble salt of a divalent metal ion and the at least one cationic polymer.

According to a preferred embodiment, the at least one anionic ultrafine ground calcium carbonate of step b) is not pretreated and/or premixed with the at least one cationic polymer of step f) before being combined with the remaining components of step a) and c) to e).

The cationic coating formulation is preferably prepared by adding the at least one cationic polymer and the at least one metal salt of a divalent metal ion to an aqueous mixture of the anionic and uncharged components of the formulation, i.e. the at least one anionic ultrafine ground, the at least one dispersing agent and the at least one non-ionic polyvinyl alcohol. Thus, according to one embodiment, step g) of the inventive process is carried out by first combining water, the at least one anionic ultrafine ground calcium carbonate, the at least one dispersing agent and the non-ionic polyvinyl alcohol followed by the addition of the at least one cationic polymer and the at least one metal salt of a divalent metal ion, or vice versa.

Furthermore, it may be advantageous to carry out step g) by adding the at least one metal salt of a divalent metal ion at last. Thus, according to one embodiment, step g) is carried out by adding the at least one metal salt of a divalent metal ion at last.

According to a preferred embodiment, step g) of the inventive process is carried out by first combining water, the at least one anionic ultrafine ground calcium carbonate, the at least one dispersing agent and the non-ionic polyvinyl alcohol followed by the addition of the at least one cationic polymer and the at least one metal salt of a divalent metal ion.

The combining (or mixing) of the water of step a), the at least anionic ultrafine ground calcium carbonate of step b), the at least one non-ionic polyvinyl alcohol of step c), the at least one water-soluble salt of a divalent metal ion of step d), the at least one dispersing agent of step e), and the at least one cationic polymer of step f), which is carried out in step g) can be accomplished by any conventional means known to the skilled person. The skilled person will adapt the combining (or mixing) conditions such as the mixing speed and temperature according to his process equipment.

Uses of the Cationic Coating Formulation

A further aspect of the present invention refers to the use of the cationic coating formulation as described herein for manufacturing a digital print medium.

Most commonly, the manufacturing of a digital print medium comprises at least the steps of:
i) providing a substrate having a first and a reverse side,
ii) applying a coating formulation on at least one side of the substrate to form at least one coating layer.

Suitable substrates for the manufacturing of a digital print medium are, for example, paper, paperboard, containerboard, textile, metal, concrete, wood or wood-based board, or a polymer.

It is often desirable to coat the substrate of a digital print medium on its first and its reverse side. Thus, method step ii) is sometimes carried out on the first and the reverse side of the substrate to manufacture a digital print medium being coated on the first and the reverse side. This step may be carried out for each side separately or may be carried out on the first and the reverse side simultaneously. It may also be advantageous for the properties of the digital print medium that step ii) is carried out a second time or more times using a different or the same coating formulation.

There are several methods known in the art to apply a coating formulation onto a substrate. Suitable coating methods are, e.g., air knife coating, electrostatic coating, metering size press, film coating, spray coating, wound wire rod coating, slot coating, slide hopper coating, gravure, curtain coating, high speed coating and the like. Some of these methods allow for simultaneous coatings of two or more layers, which is often preferred from a manufacturing economic perspective. In case a liquid coating formulation has to be applied onto a substrate, the methods of choice are often high speed coating, metering size press, curtain coating, spray coating, or blade coating, preferably curtain coating The cationic coating formulation as described herein can be used in such manufacturing processes to improve the surface properties of the digital print medium. More specifically, the inventors surprisingly found that the cationic coating formulation forms a coating layer having a very good and uniform coverage, a high brightness and a high gloss. Furthermore, it was found that the brightness of the coating layer is not decreased by substrates with a significantly lower brightness. Thus, the use of the inventive formulation allows to select, for example, brown substrates for the manufacturing of a digital print medium without compromising the image quality of the print.

According to one embodiment, the cationic coating formulation increases the brightness of the digital print medium by 10%, preferably 30%, more preferably 50%, as measured according to ISO R457 (Tappi452) and DIN 6167.

According to one embodiment of the present invention, the cationic coating formulation is used in the manufacturing of an inkjet print medium. Thus, the inventive formulation is used to form an ink-receptive coating layer onto the surface of a substrate. In "ink-receptive coating layer" in the meaning of the present invention is a permeable coating layer which is applied to a substrate in order to absorb and transport ink solvent towards the substrate and to retain the pigments and/or dyes deposited thereon.

The inventors surprisingly found that the specific cationic coating formulation as disclosed herein can be used to form an ink-receptive coating layer which has an improved ink absorbability. Furthermore, the coating layer retains the ink pigments and/or dyes at the surface of the coating layer, thereby improving the optical print density of the printed image.

According to one embodiment, the digital print medium is a paper, paperboard, containerboard, textile, metal, concrete, wood or wood-based board, or a polymer, preferably a paper, paperboard or containerboard, and preferably paper, paperboard or containerboard.

The digital print medium is not particularly limited to a certain type of paper or paper with a specific basis weight. However, in one embodiment, the paper has a basis weight in the range from 25 to 600 $g/m^2$, preferably from 70 to 250 $g/m^2$, and more preferably from 80 to 150 $g/m^2$.

A "containerboard" in the meaning of the present invention is a sheet-like product formed by a corrugated member glued or fixed to, or between, one or more relatively flat facing liner. The liner is usually a kraft paper, which is made from, optionally recycled, coarse brown-coloured wood pulp.

Wood being suitable for the use as a digital print medium is derivable from, for example, spruce, pine, alder, birch, beech or oak. The term "wood-based board" refers to fibre boards such as a high-density fibre (HDF) board, medium-density fibre (MDF) board, low-density fibre (LDF) board, a particle board, an oriented strandboard (OSB), a hardboard or an insulation board.

Suitable polymers as substrate for the digital print medium comprise, for example, polyethylene, polypropylene, polybutadiene, polystyrene, polyamide, polyester, poly (meth)acrylate, PET, polyvinyl chlorides, co-polymers thereof, and cellulose-derived polymers such as cellophane.

The digital print medium may further be pretreated and/or calendered. Thus, according to another embodiment, the digital print medium is pre-treated and/or calendered. A "pre-treatment" may be any measure to improve the surface properties of the digital print medium prior to the application of the inventive formulation such as pre-coating, corona treatment, flame treatment, cleaning, sanding, levelling or polishing. The term "calendered" relates to a digital print medium which has been submitted to a series of hard pressure rollers to form or smooth a sheet of material such as paper or plastic film.

The digital print medium may be a pre-coated digital print medium. Thus, according to one embodiment, the digital print medium is a pre-coated digital print medium. The pre-coating is not specifically limited and any pre-coating commonly used by the skilled person for the respective print medium may be suitable. For example, a suitable pre-coating may comprise at least one pigment such as non-ultrafine calcium carbonates or titanium dioxide, at least one binder and/or at least one rheology modifier. A "non-ultrafine" calcium carbonate in the meaning of the present invention is a calcium carbonate with a particle size $d_{50}$ of >300 nm.

A suitable binder for a pre-coating may be, for example, an anionic carboxylated styrene/butadiene copolymer.

A suitable rheology modifier for a pre-coating may be, for example, an acrylate copolymer or a sodium sulphosuccinate.

The pre-coating may be applied to the digital print medium in solid or in liquid form. Typically, the pre-coating may be applied in liquid form as a liquid pre-coating formulation, especially an aqueous pre-coating formulation. The weight amounts of the specific components of the pre-coating formulation are not specifically limited. For example, a suitable pre-coating formulation may comprise from 45 to 60 wt.-% of at least one pigment, from 10 to 15 wt.-% of at least one binder, from 0.1 to 0.5 wt.-% of at least one rheology modifier, and from 30 to 40 wt.-% of water, based on the total weight of the pre-coating formulation, wherein the total sum of the components in the pre-coating formulation is 100 wt.-%.

According to a preferred embodiment, the digital print medium is a pre-coated inkjet print medium, and more preferably a pre-coated paper, paperboard or containerboard.

According to another embodiment, the digital print medium contains recycled material. For example, the digital print medium can contain recycled paper or paperboard, recycled plastic, or recycled wood fibres, and preferably recycled paper or paperboard.

According to one embodiment, the recycled material is present in the digital print medium in an amount of 50 to 99.5 wt.-%, preferably 70 to 98 wt.-%, based on the total weight of the digital print medium.

The inventors surprisingly found that the above-described advantageous properties of the coating layer formed by the inventive coating formulation makes the application of a primer as defined herein unnecessary to achieve a satisfying quality of a printed image. Thus, a manufacturing of a digital print medium, which includes the step of applying the inventive formulation onto the digital print medium, does not need to include a step of applying a primer beforehand or thereafter.

According to one embodiment, the cationic coating formulation is used in a manufacturing of a digital print medium, wherein no primer is added to the digital print medium after the application of the cationic coating formulation onto the digital print medium. According to another embodiment, the cationic coating formulation is used in a manufacturing of a digital print medium, wherein no primer is added to the digital print medium prior to the application of the cationic coating formulation onto the digital print medium. According to yet another embodiment, the cationic coating formulation is used in a manufacturing of a digital print medium, wherein no primer is added to the digital print medium prior to and after the application of the cationic coating formulation onto the digital print medium.

It is appreciated by the skilled person that a primer may also be applied onto the digital print medium directly before printing, i.e. in-line of the printing machine. It is explicitly set out herein that also such an application is considered to be part of the manufacturing of a digital print medium in the meaning of the present invention. Thus, also an application of a primer onto a digital print medium coated with the inventive formulation is considered to be an addition of a primer after the application of the cationic coating formulation, if carried out in-line the printing machine, i.e. directly before printing.

The scope and interest of the invention will be better understood based on the following examples which are intended to illustrate certain embodiments of the invention and are non-limitative.

EXPERIMENTAL SECTION

1. Measurement Methods

Figure 1:
FIG. 1 shows an inkjet print image on a digital print medium coated with the inventive cationic coating formulation (printed on HP Web Press T 1100S).

In the following, materials and measurement methods implemented in the examples are described.

Particle Size

The particle size distribution of the pigment particles was measured using a Sedigraph 5120 from the company Micromeritics, USA. The method and the instruments are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics.

Solids Content of an Aqueous Suspension

The suspension solids content (also known as "dry weight") was determined using a Moisture Analyser HR73 from the company Mettler-Toledo, Switzerland, with the following settings: temperature of 120° C., automatic switch off 3, standard drying, 5 to 20 g of suspension.

Brookfield Viscosity

The Brookfield viscosity of the liquid coating compositions was measured after one hour of production and after one minute of stirring at room temperature at 100 rpm by the use of a Brookfield viscometer type RVT equipped with an appropriate spindle.

Specific Surface (BET) Measurement

The specific surface area (in $m^2/g$) of the mineral filler was determined using nitrogen and the BET method, which is well known to the skilled man (ISO 9277:2010). The total surface area (in m$^2$) of the mineral filler was then obtained by multiplication of the specific surface area by the mass (in g) of the mineral filler. The method and the instrument are known to the skilled person and are commonly used to determine the specific surface of fillers and pigments.

pH Measurement

The pH was measured at 25° C. using a Mettler Toledo Seven Easy pH meter and a Mettler Toledo InLab® Expert Pro pH electrode. A three point calibration (according to the segment method) of the instrument was first made using commercially available buffer solutions having pH values of 4, 7 and 10 at 20° C. (from Aldrich). The reported pH values were the endpoint values detected by the instrument (the endpoint was when the measured signal differs by less than 0.1 mV from the average over the last 6 seconds).

Formation of a Compacted Bed

A compacted bed or tablet formulation of a pigment was formed in a wet tablet press apparatus by applying a constant pressure (usually 15 bar) to the pigment suspension or slurry for several hours such that water is released by filtration through a fine 0.025 µm filter membrane resulting in a compacted bed or tablet of the pigment with a diameter of about 4 cm and a thickness of 1 to 1.5 cm. The obtained tablets can be divided and fashioned into suitable sample configurations for subsequent analysis. The apparatus used is shown schematically in Ridgway et al. "Modified calcium carbonate coatings with rapid absorption and extensive liquid uptake capacity" (Colloids and Surfaces A: Physiochem. and Eng. Asp. 2004, 236(1-3), 91-102). The tablets were removed from the apparatus and dried in an oven at 60° C. for 24 hours.

Porosity Measurements

Portions of a compacted bed or tablet formulation were characterized by mercury porosimetry for porosity, intruded total specific void volume, and pore size distribution using a Micromeritics Autopore IV mercury porosimeter. The maximum applied pressure of mercury was 414 MPa, equivalent to a Laplace throat diameter of 0.004 µm. The data were corrected using Pore-Comp (P. A. C. Gane et al. "Void Space Structure of Compressible Polymer Spheres and Consolidated Calcium Carbonate Paper-Coating Formulations" (Industrial and Engineering Chemistry Research 1996, 35 (5), 1753-1764) for mercury and penetrometer effects, and also for sample compression. By taking the first derivative of the cumulative intrusion curves the pore size distributions based on equivalent Laplace diameter, inevitably including pore-shielding, was revealed. Volume defined median pore diameter was calculated from the mercury intrusion curve, and volume defined pore size polydispersity as full width at half maximum (FWHM) is calculated from the pore size distribution curve.

Permeability Measurements

According to Ridgway et al. "A new method for measuring the liquid permeability of coated and uncoated papers and boards" (Nordic Pulp and Paper Research Journal 2003, 18(4), 377-381) for measuring the permeability, measurement samples were prepared by placing a cuboidal piece of a tablet (compacted bed) structure having an area of 15 mm×15 mm and a height of 10 mm into a PTFE-mould and pouring the resin Technovit 4000 (Heraeus GmbH, Wherheim/Ts, Germany) around it to produce a sample disk having a diameter of 30 mm. The quickly rising viscosity of the chosen curing resin results in a penetration of approximately 1 mm locally at the outer boundaries of the sample. This penetration depth is clearly visible because of the opacity change at the edge of the sample and can, therefore, be calibrated. The open area of the porous sample, i.e. that free from resin, is evaluated so that the permeable cross-sectional area can be established. The sample discs are placed in a dish containing the probe liquid in order to saturate the void network of the sample before placing in the apparatus. Hexadecane was used in the experiments with density, $\rho=773$ kgm$^{-3}$ and viscosity, $\eta=0.0034$ kgm$^{-1}$ s$^{-1}$ to avoid any interaction with synthetic or natural binders if present. The sample disc is then placed in a specially constructed pressure cell. The cell design used for the pressurised permeability experiments is described in Ridgway et al. (Nordic Pulp and Paper Research Journal 2003, 18(4), 377-381). Gas over-pressure is supplied from a nitrogen bottle. The pressure cell is fixed over a Mettler Toledo AX504 microbalance and a PC samples the balance data by a software. A drop captor device in the base of the cell guides the permeated liquid drops to the outlet. The whole chamber below the position of the sample was pre-wetted with the liquid so that each drop leaving the sample causes a drop to fall into the sampling dish.

Absorption Rate Measurements

According to Schoelkopf et al. "Measurement and network modelling of liquid permeation into compacted mineral blocks" (Journal of Colloid and Interface Science 2000, 227(1), 119-131) for the measurement of the "absorption rate", compacted bed samples were coated with a thin barrier line of silicone around the base of the vertical edges arising from the basal plane to reduce artefacts caused by the wetting of their outer surfaces. The remainder of the outer planes were not coated, to allow for the free movement of displaced air or liquid during absorption, and to minimise any interaction between the silicone and the absorbed liquid. Once the sample is lowered to contact the absorbing fluid source, the weight loss from the dish is continually recorded using an automated microbalance, namely a PC-linked Mettler Toledo AX504 balance with a precision of 0.1 mg, capable of 10 measurements per second, accounting for any evaporation if present. When the recorded weight is constant, indicative of absorption-saturation, the measurement is complete. Knowing the sample weight before and after the absorption measurement allows the intruded volume per gram of sample to be calculated. (Dividing the weight difference by the density of the liquid gives the volume intruded into the sample, and hence the volume per gram of sample).

Polyelectrolyte Titration (PET)

The polyelectrolyte content in the aqueous suspension is determined using a Memotitrator of the Mettler DL 5x or Tx series equipped with a Phototrode DP 660 or DP5 commercialised by Mettler-Toledo, Switzerland. The measurements of the polyelectrolyte content was carried out by weighing a sample of the dispersed calcium carbonate or the cationic coating formulation into a titration vessel and diluting said sample with deionized water up to a volume of approximately 40 ml. Subsequently, 10 ml of 0.01 M cationic poly(dimethyldiallylammonium chloride) (PolyDADMAC; obtained from Merck (former Sigma-Aldrich)) are slowly added under stirring into the titration vessel within 5 min. and then the content of the vessel is stirred for another 20 min. Afterwards the suspension is filtered through a 0.2 μm mix-ester membrane filter (Ø 47 mm) and washed with 5 ml of deionized water. The thus obtained filtrate is diluted with 5 ml of acetate buffer pH 4.65 (Sigma-Aldrich/Merck, Switzerland) and then 0.01 M of a potassium polyvinylsulfate (KPVS; obtained from SERVA Feinbiochemica, Heidelberg) solution is added slowly to the filtrate to titrate the excess of cationic reagent. The endpoint of titration is detected by a Phototrode DP660 or DP5, which is adjusted to 1200 to 1800 mV in deionized water, prior to such measurement. The charge calculation is carried out according to the following evaluation:

$$Q_{atro} = \frac{((V_{PDADMAC} * t_{PDADMAC}) - V_{KPVS}) * (-1000)}{m_{sample} * FS} [\mu Val/g]$$

$$w_{atro} = \frac{Q_{atro}}{K_{DP} * 100} [\%]$$

Calculation of the exact weight-in quantity:

$$m_P = \frac{60}{w_{DP} * K_{DP} * FS}$$

Correction calculation for consumption of 4 mL:

$$m_{4ml} = \frac{m_1 * 6}{(10 - V_{KPVS,1})}$$

Abbreviations
$m_P$=Weight-in quantity of sample [g]
$w_{DP}$=Dispersing agent content in [%]
$K_{DP}$=Dispersing agent constant [μVal/0.1 mg dispersing agent]
FS=Solids content [%]
$V_{PDADMAC}$=Volume PolyDADMAC [ml]
$V_{KPVS}$=Volume KPVS [ml]
$t_{PDADMAC}$=Titer PolyDADMAC
Q=Charge [μVal/g]
$w_{atro}$=Dispersing agent content atro [%]
$m_1$=Sample weight of experiment to be optimised [g]
$V_{KPVS,1}$=experimental consumption KPVS [ml] of experiment to be optimised 2. Examples The following components were used to prepare the cationic coating formulation applied to the substrate.

Substrate: Recycled fluting of the company SAICA, Spain, sold under the name "Saica medium" with a basis weight of 127 g/m².

Pigment 1: Naturally ground calcium carbonate ($d_{50}$: 250 nm, BET: 24.8 m²/g)

Pigment 2: Naturally ground calcium carbonate ($d_{50}$: 0.6 μm and a $d_{98}$: 4 μm), commercially available from Omya AG, Switzerland Binder: Polyvinyl alcohol BF-08, sold by the company CCP Taiwan Water-soluble divalent metal ion salt: Calcium chloride, sold by the company Sigma-Aldrich Dispersing agent: Sodium polyacrylate/sodium phosphate based dispersing agent, which is a blend of a partially neutralized sodium polyacrylate (with a molecular weight Mw equal to 12 000 Dalton, measured by GCP) and sodium phosphates, produced by mixing an aqueous solution of 40 wt.-% sodium polyacrylate and a phosphoric acid (85 wt.-% in $H_2O$) in a ratio 2:1 in respect to active dry weight of each additive Cationic polymer: Catiofast® BP, a water-soluble poly-DADMAC, sold by the company BASF Table 1 shows the properties of the pigment used to produce the cationic coating formulations.

TABLE 1

Pigment properties.

| Pigment | intruded total specific void volume [cm³/g] | Median pore diameter [μm] | FWHM [μm] | specific surface area (BET) [m²/g] | $d_{50}$ [μm] | Modality | Charge of pigment [μVal/g] |
|---|---|---|---|---|---|---|---|
| Pigment 1 (inventive) | 0.303 | 0.06 | 0.042 | 24.8 | 0.250 | Monomodal | −45.3 (±0.5) |
| Pigment 2 (prior art) | 0.234 | 0.10 | 0.038 | 8.7 | 0.6 | Monomodal | −21.3 (±0.7) |

Preparation of Cationic Coating Formulations

The pigments 1 and 2 were used to prepare different cationic coating formulations (see Table 2) to demonstrate the invention.

TABLE 2

Cationic coating formulations.

| | Coating formulation A (prior art) [wt.-%, based on total weight of the formulation] | Coating formulation B (inventive) [wt.-%, based on total weight of the formulation] |
|---|---|---|
| Pigment 1 | — | 54.4 |
| Pigment 2 | 65.8 | — |
| Binder | 1.1 | 1.1 |
| Divalent metal ion salt | 0.2 | 0.2 |
| Dispersing agent | 0.3 | 0.6 |
| Cationic polymer | 1.0 | 1.0 |
| Water | 31.6 | 42.7 |

The cationic coating formulations were prepared by adding the compounds into an appropriate container:
1. Water
2. Pigment
3. Dispersing agent
4. Binder
5. Cationic polymer, and
6. Divalent metal ion salt and stirring the resulting mixture with a Disperlux Pendraulik Dissolver ID100 at a speed of 4500 rpm at room temperature.

The properties of the prepared coating formulations are listed in Table 3.

TABLE 3

Properties of the coating formulations

|  | Coating formulation A (prior art) | Coating formulation B (inventive) |
| --- | --- | --- |
| Charge (measured by PET) | +138.4 (± 8.8) | +113.2 (± 7.8) |
| Solids content (wt.-%) | 52.3 | 52.3 |

Preparation of Coated Paper

Substrate: Top ply sized testliner III with a basis weight (grammage) of 125 g/m², commercially available from Hamburger Pitten GmbH & Co. KG, Austria.

The substrate was subjected to a softnip calandering to a Bendtsen roughness of 300 ml/min using an OptiCalender Soft of the company Valmet, Finland.

Then, the calendered substrate was pre-coated with the following pre-coating formulation.

TABLE 4

Composition of the pre-coating formulation

|  | Pre-coating formulation [wt.-%, based on total weight of the formulation] |
| --- | --- |
| Pigment 2 | 44.82 |
| Pigment 3 | 11.96 |
| Binder | 7.68 |
| Rheology modifier (Lumiten I-SC) | 0.13 |
| Rheology modifier (Sterocoll DF3x) | 0.13 |
| Water | 35.27 |
| Solids content % | 68.0 |

Binder: Litex PX 9464 (anionic carboxylated styrene/butadiene copolymer), commercially available from Synthomer Deutschland GmbH, Germany.

Pigment 3: $TiO_2$; supplied by Hunstman as SR3 slurry,

Rheology modifiers: Sterocoll DF3x (acrylate copolymer) and Lumiten I-SC (Solution of sodium sulphosuccinate), both commercially available from BASF, Germany The pre-coating was applied with an amount of 15 g/m² by an OptiCoat layering curtain coater of the company Valmet, Finland. The application speed was 1000 m/min, and the resulting pre-coated substrate was air hood dried on the coating machine to and end moisture content of 7.5%.

Then, coating formulation A (prior art) or coating formulation B (inventive) was coated on the pre-coated substrate using an OptiCoat jet blade coater of the company Valmet, Finland. The respective coating formulation was applied in an amount of 15 g/m². The application speed was 1000 m/min, and the resulting coated substrate (print medium) was air hood dried on the coating machine to an end moisture content of 7.5%.

Print Evaluation

The obtained coated substrate (print medium) was then subjected to inkjet printing using a HP Web Press T 1100S and standard HP printing inks.

The print quality of the obtained inkjet printed medium was analysed by visual inspection the presence or absence of feathering. Feathering is a printing defect characterized by ink spreading at the edges of a printed area, typically caused by irregularities in ink distribution and/or absorption on the surface of the paper.

First the obtained printed medium was scanned and 60-times magnified. The results of the magnification are shown in FIG. 1 (print medium coated with inventive coating formulation B) and FIG. 2 (print medium coated with prior art coating formulation A).

Figure 2:
FIG. 2 shows an inkjet print image on a prior art digital print medium (printed on HP Web Press T 1100S).

In view of the print images shown in FIG. 1. and FIG. 2, it becomes evident that the print medium coated with the inventive cationic coating formulation B does not show any feathering, whereas the print medium coated with the prior art coating formulation A shows feathering.

The invention claimed is:

1. A cationic coating formulation consisting of:
   water,
   at least one anionic ultrafine ground calcium carbonate,
   at least one non-ionic polyvinyl alcohol,
   at least one water-soluble salt of a divalent metal ion,
   at least one dispersing agent, and
   at least one cationic polymer,
   wherein the at least one anionic ultrafine ground calcium carbonate, when in the form of a compacted bed, has
   a monomodal pore size distribution,
   a volume defined pore size polydispersity expressed as full width at half maximum (FWHM) from 40 to 80 nm, and
   a volume defined median pore diameter from 30 to 80 nm;
   wherein
   the cationic coating formulation has a solid content in the range from 10 to 80 wt.-%, based on the total weight of the cationic coating formulation,
   the at least one water-soluble salt of a divalent metal ion is selected from the group consisting of $CaCl_2$, $CaBr_2$, $CaI_2$, $Ca(NO_3)_2$, $MgCl_2$, $MgBr_2$, $MgI_2$, and $Mg(NO_3)_2$, and
   the at least one dispersing agent is selected from a polyacrylate-based dispersing agent, phosphates, a polyphosphate-based dispersing agent, carboxymethyl cellulose or a salt thereof, or a mixture thereof.

2. The cationic coating formulation according to claim 1, consisting of the following components
   30-60 wt.-% of water,
   30-60 wt.-% of the at least one anionic ultrafine ground calcium carbonate,
   0.1-3.0 wt.-% of the at least one non-ionic polyvinyl alcohol,
   0.1-4.0 wt.-% of the at least one dispersing agent,
   0.1-4.0 wt.-% of the at least one water-soluble salt of a divalent metal ion, and
   0.1-5.0 wt.-% of the at least one cationic polymer,
   based on the total weight of the cationic coating formulation, and wherein the total sum of the components in the cationic coating formulation is 100 wt.-%.

3. The cationic coating formulation according to claim 1, wherein the at least one dispersing agent is a mixture of (a) a polyacrylate-based dispersing agent and (b) phosphoric acid and/or one or more salt(s) of phosphoric acid.

4. The cationic coating formulation according to claim 1, wherein the at least one dispersing agent is selected from a polyacrylate-based dispersing agent, a polyphosphate-based dispersing agent, carboxymethyl cellulose or a salt thereof, or a mixture thereof.

5. The cationic coating formulation according to claim 1, wherein the at least one cationic polymer is polydiallyldimethylammonium chloride (PolyDadmac) or a polyethyleneimine.

6. The cationic coating formulation according to claim 1, wherein the at least one anionic ultrafine ground calcium carbonate is in the form of an aqueous suspension having a solids content in the range from 10 to 99.9 wt.-%, based on the total weight of the aqueous suspension.

7. The cationic coating formulation according to claim 1, wherein the cationic coating formulation has a solid content in the range from 20 to 70 wt.-%, based on the total weight of the cationic coating formulation.

8. The cationic coating formulation according to claim 1, consisting of the following components:
 40-60 wt.-% of water,
 30-56 wt.-% of the at least one anionic ultrafine ground calcium carbonate,
 0.5-2.0 wt.-% of the at least one non-ionic polyvinyl alcohol,
 0.3-1.0 wt.-% of the at least one dispersing agent,
 0.1-1.5 wt.-% of the at least one water-soluble salt of a divalent metal ion, and
 0.1-2.5 wt.-% of the at least one cationic polymer,
 based on the total weight of the cationic coating formulation, wherein the total sum of the components in the cationic coating formulation is 100 wt.-%,
 wherein the at least one dispersing agent is a polyacrylate-based dispersing agent,
 wherein the at least one water-soluble salt of a divalent metal ion is $CaCl_2$, and
 wherein the at least one cationic polymer is polydiallyldimethylammonium chloride (PolyDadmac).

9. The cationic coating formulation according to claim 1, wherein the at least one water-soluble salt of a divalent metal ion is $CaCl_2$.

10. The cationic coating formulation according to claim 1, wherein the at least one anionic ultrafine ground calcium carbonate is in the form of an aqueous suspension having a solids content in the range from 30 to 80 wt.-%, based on the total weight of the aqueous suspension.

11. The cationic coating formulation according to claim 1, wherein the at least one anionic ultrafine ground calcium carbonate is in the form of an aqueous suspension having a solids content in the range from 50 to 70 wt.-%, based on the total weight of the aqueous suspension.

12. The cationic coating formulation according to claim 1, wherein the cationic coating formulation has a solid content in the range from 30 to 60 wt.-%, based on the total weight of the cationic coating formulation.

13. The cationic coating formulation according to claim 1, wherein the cationic coating formulation comprises 0.1-5.0 wt.-% of the at least one cationic polymer, based on the total weight of the cationic coating formulation.

14. A process for the preparation of the cationic coating formulation according to claim 1 comprising the steps of:
 a) providing the water,
 b) providing the at least one anionic ultrafine ground calcium carbonate,
 c) providing the at least one non-ionic polyvinyl alcohol,
 d) providing the at least one water-soluble salt of a divalent metal ion,
 e) providing the at least one dispersing agent,
 f) providing the at least one cationic polymer, and
 g) combining the components of steps a) to f) to form the cationic coating formulation.

15. A process for preparing a digital print medium, comprising:
 i) providing a substrate having a first and a reverse side,
 ii) applying the cationic coating formulation according to claim 1 on at least one side of the substrate to form at least one coating layer.

16. The process according to claim 15, wherein the substrate is (1) a polymer which is optionally pretreated, optionally calendered, or both, or (2) paper, paperboard, containerboard, textile, metal, concrete, wood or wood-based board, wherein the paper, paperboard, containerboard, textile, metal, concrete, wood or wood-based board is optionally pretreated, optionally calendered, or both.

17. The process according to claim 15, wherein the substrate is a pre-coated substrate.

18. The process according to claim 15, wherein the digital print medium comprises recycled material.

19. The process according to claim 18, wherein the recycled material is present in the digital print medium in an amount of 50 to 99.5 wt.-%, based on the total weight of the digital print medium.

20. The process according to claim 15, wherein the cationic coating formulation increases the brightness of the digital print medium by 10%, as measured according to ISO R457 (Tappi452) and DIN 6167.

21. The process according to claim 15, wherein no primer is added prior and/or after the application of the cationic coating formulation onto the digital print medium.

22. The process according to claim 15, wherein the substrate is paper, paperboard, or containerboard.

23. The process according to claim 15, wherein the cationic coating formulation increases the brightness of the digital print medium by 50%, as measured according to ISO R457 (Tappi452) and DIN 6167.

24. The process according to claim 18, wherein the recycled material is present in the digital print medium in an amount of 70 to 98 wt.-%, based on the total weight of the digital print medium.

* * * * *